United States Patent
Lee

(10) Patent No.: US 7,907,476 B2
(45) Date of Patent: Mar. 15, 2011

(54) ELECTRONIC DEVICE WITH A TOUCHSCREEN DISPLAYING AN ANALOG CLOCK

(75) Inventor: Jong Hee Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 385 days.

(21) Appl. No.: 12/027,131

(22) Filed: Feb. 6, 2008

(65) Prior Publication Data

US 2008/0186808 A1 Aug. 7, 2008

(30) Foreign Application Priority Data

Feb. 7, 2007 (KR) .................. 10-2007-0012635

(51) Int. Cl.
*G04B 47/00* (2006.01)
*G04C 19/00* (2006.01)
*G06F 3/041* (2006.01)
*H04B 1/38* (2006.01)

(52) U.S. Cl. ............ 368/10; 368/82; 368/187; 345/173; 455/566

(58) Field of Classification Search ............ 368/28, 368/29, 82, 187, 239, 10, 69, 84, 240, 242; 345/173; 705/8
See application file for complete search history.

(56) References Cited

U.S. PATENT DOCUMENTS

| | | | | |
|---|---|---|---|---|
| 4,005,400 A | * | 1/1977 | Engdahl | 341/5 |
| 4,139,837 A | | 2/1979 | Liljenwall et al. | |
| 5,247,284 A | * | 9/1993 | Fleming | 345/156 |
| 5,487,054 A | * | 1/1996 | Capps et al. | 368/185 |
| 5,583,833 A | * | 12/1996 | Capps et al. | 368/185 |
| 6,201,769 B1 | * | 3/2001 | Lewis | 368/10 |
| 6,266,295 B1 | * | 7/2001 | Parker et al. | 368/28 |
| 6,601,988 B2 | * | 8/2003 | Molander | 368/187 |
| 7,065,718 B2 | * | 6/2006 | Lection | 715/863 |
| 7,274,375 B1 | * | 9/2007 | David | 345/619 |
| 7,590,553 B2 | * | 9/2009 | Coates et al. | 705/8 |
| 2001/0055244 A1 | | 12/2001 | Kim | |
| 2004/0218472 A1 | * | 11/2004 | Narayanaswami et al. | 368/10 |
| 2004/0225966 A1 | * | 11/2004 | Besharat et al. | 715/705 |

FOREIGN PATENT DOCUMENTS

| | | |
|---|---|---|
| GB | 2092352 | 8/1982 |
| JP | 57-206888 | 12/1982 |
| WO | 2006111481 | 10/2006 |

* cited by examiner

*Primary Examiner* — Vit W Miska
(74) *Attorney, Agent, or Firm* — Lee, Hong, Degerman, Kang & Waimey

(57) ABSTRACT

An electronic device, such as a mobile terminal, includes a touchscreen display and a control unit for operating responsive to user contact with the display. The control unit is configured to display an analog clock, detect user contact with the display, and adjust displayed position of a selected clock hand of the analog clock responsive to relative locations on the display that the detected user contact occurs.

21 Claims, 9 Drawing Sheets

ELECTRONIC DEVICE WITH A TOUCHSCREEN DISPLAYING AN ANALOG CLOCK

CROSS-REFERENCE TO RELATED APPLICATIONS

Pursuant to 35 U.S.C. §119(a), this application claims the benefit of earlier filing date and right of priority to Korean Application No. 10-2007-0012635, filed on Feb. 7, 2007, the contents of which are hereby incorporated by reference herein in their entirety.

FIELD OF THE INVENTION

The present invention relates to electronic devices, and in particular to a method for adjusting an analog clock displayed on a touchscreen display of an electronic device.

DISCUSSION OF THE RELATED ART

Conventional electronic devices include various time setting functions which are associated with assorted applications. For example, a user can set an alarm, such as a morning wake-up alarm, using an electronic device. Another example is one in which the time setting function may be used to set or reserve a time or reserve a specific event. The time setting function is often operated by a user manipulating a direction or number key to set a desired time. However, this function is cumbersome when the electronic device utilizes a touchscreen for which the user interacts with the time setting function.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an embodiment, a method for adjusting an analog clock displayed on a touchscreen display of an electronic device includes displaying the analog clock on the display. The analog clock may have one or more clock hands. The method further includes detecting user contact on the display, and adjusting displayed position of a selected clock hand responsive to relative locations on the display that the detected user contact occurs.

In one aspect, method further includes applying time identified by the analog clock to an application operating on the electronic device.

In another aspect, the application is a user adjustable alarm clock, and the time identified by the analog clock represents a time at which an alarm is triggered.

In yet another aspect, the application is a user modifiable scheduler.

In still yet another aspect, the application is a device time application providing time to applications operating on the electronic device.

In other aspects, the method further includes applying time identified by the analog clock to reserve an event in a reservation application operating on the electronic device.

In one feature, the analog clock comprises a clock face and a center about which the one or more clock hands effectively rotate.

In another feature, the analog clock is an elapsed time clock, and the method further includes causing an application operating on the electronic device to terminate according to the elapsed time identified by the analog clock.

In yet another feature, the method further includes causing an application operating on the electronic device to terminate at a time identified by the analog clock.

In still yet another feature, the method further includes displaying digital time on the display which corresponds to time represented by the analog clock.

In accordance with another alternative embodiment, an electronic device, such as a mobile terminal, includes a touchscreen display and a control unit for operating responsive to user contact with the display. The control unit is configured to display an analog clock, detect user contact with the display, and adjust displayed position of a selected clock hand of the analog clock responsive to relative locations on the display that the detected user contact occurs.

In accordance with an alternative embodiment, a method for adjusting an analog clock displayed on a touchscreen display of an electronic device includes displaying the analog clock on the display and detecting user contact with the display. The method further includes adjusting displayed position of a selected clock hand responsive to relative locations on the display upon which the detected user contact occurs, and applying time represented by the analog clock to an application operating on the electronic device.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or similar parts.

In accordance with embodiments of the present invention, techniques for adjusting an analog clock may be implemented in a variety of different types of electronic devices having a touchscreen. Examples of such devices include computers, portable digital assistants (PDAs), mobile terminals, and the like. By way of non limiting example only, further description will be with regard to a mobile terminal. However, such teachings apply equally to other types of electronic devices.

Figure 1:
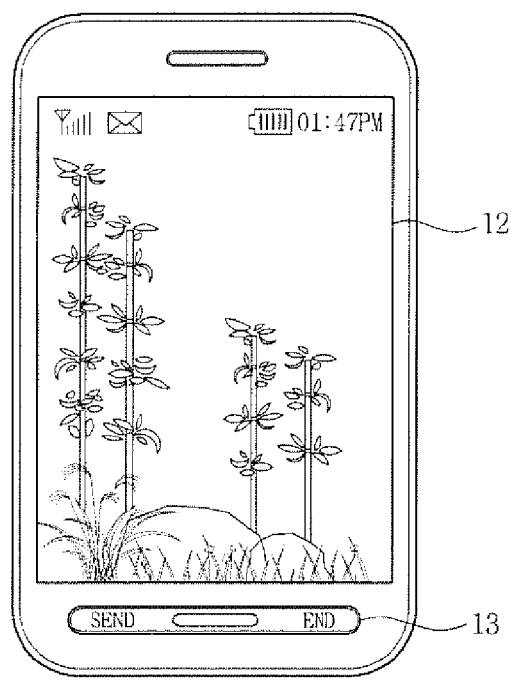
FIG. 1 is a block diagram showing a front view of a mobile terminal having a touchscreen.
Figure 2:
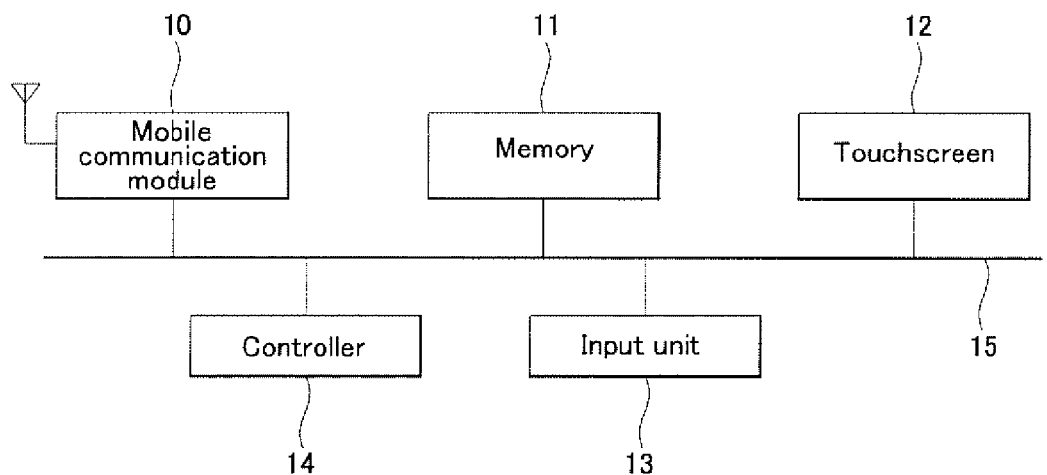
FIG. 2 is a block diagram showing various components which may be implemented in the mobile terminal of FIG. 1

FIG. 1 is a block diagram showing a front view of a mobile terminal having a touchscreen. FIG. 2 is a block diagram showing various components which may be implemented in the mobile terminal of FIG. 1. Mobile terminal 100 includes mobile communication module 10, memory 11, touchscreen 12, input unit 13, and controller 14. These components are typically connected via bus 15.

Module 10 may be configured as a wireless communication unit facilitating voice and data communications with a wireless communication network. Memory 11 may be used to store data and programs for controlling operation of mobile terminal 100.

Touchscreen 12 typically provides both input and display functions. The display function includes displaying various types of information (e.g., graphics, text, pictures, menus, and the like) responsive to signaling from controller 14. The input function permits user input via contact with the touchscreen using, for example, a finger, stylus, or other device which may be detected as contact with the touchscreen.

Input unit 13 receives input or commands from the user. If desired, the input unit may be associated with various number or direction keys. Some of all of the keys may be displayed to the user on touchscreen 12. Controller 14 may be structured to control various components of terminal 100 using, for example, the various methods and techniques disclosed herein.

If desired, mobile terminal 100 may include various other components and features. For example, the terminal may include a broadcast reception module for receiving a broadcast signal over a broadcast network, a communication module for communicating with a wireless Internet network, a camera module, a vibration module for generating vibration, and various sensors.

By way of example only, various methods disclosed herein will be described with regard to the terminal depicted in FIGS. 1 and 2. However, it is to be understood that the present invention is not so limited and may alternatively be implemented using other devices or systems.

Figure 3:
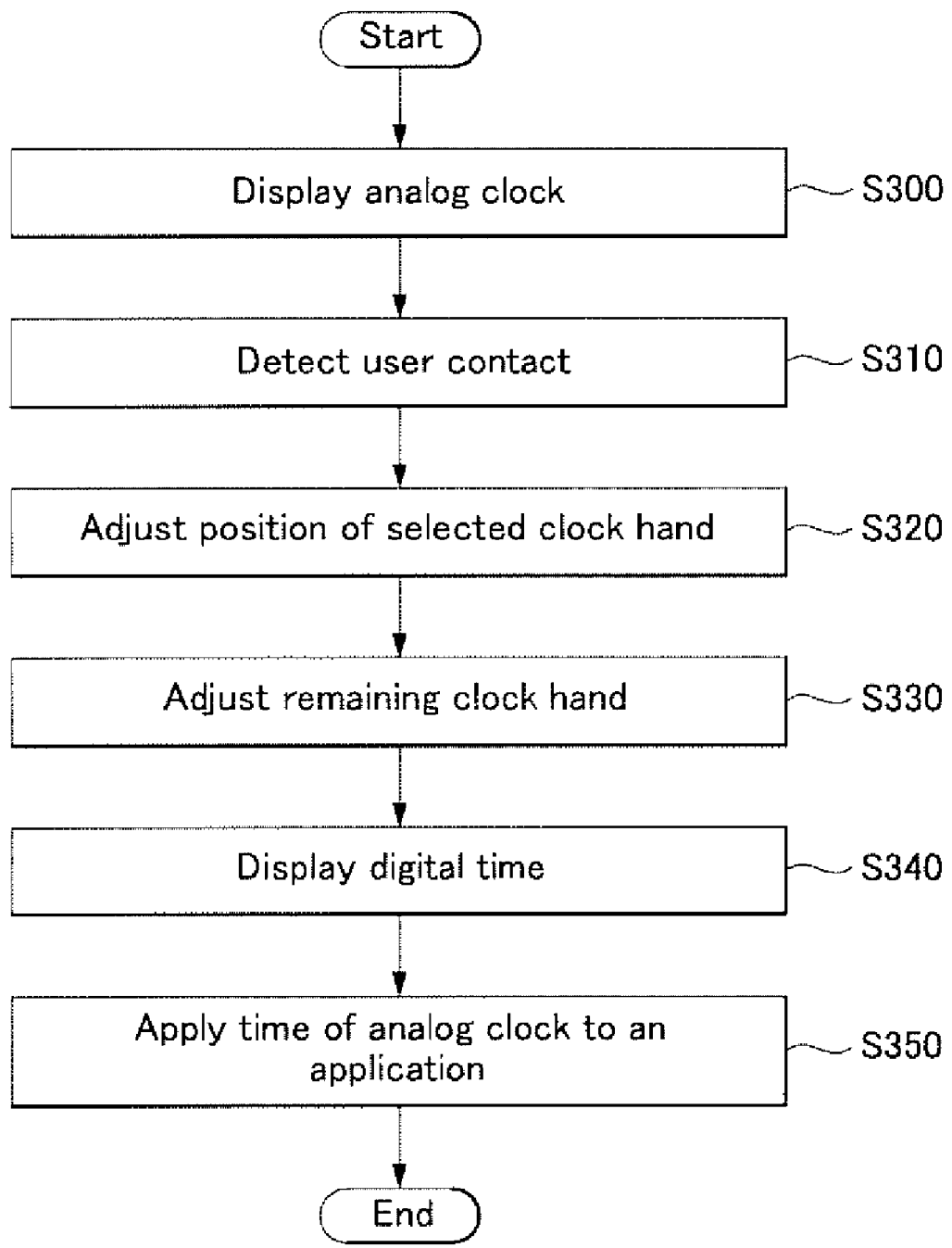
FIG. 3 is a flowchart depicting a method for adjusting an analog clock displayed on a touchscreen display of a mobile terminal.

FIG. 3 is a flowchart depicting a method for adjusting an analog clock displayed on a touchscreen display of a mobile terminal. Block 300 displays the analog clock on the display of the mobile terminal. Typically, the analog clock includes one or more clock hands (e.g., a minute hand and a hour hand). Operations of block 300 may occur during an idle mode or period of the touchscreen. The term "idle mode" refers to a mode in which a specific application that may be presented to the user is not enabled or executed. A screen displayed on the touchscreen in the idle mode may be referred to as a standby screen. Alternatively, the operations of block 300 may be implemented in a mode in which a specific application is enabled.

At block 310, user contact with the display is detected. The user contact may be accomplished via contact within a predetermined or identifiable area of the touchscreen a number of times which correspond to selecting a specific clock hand. If desired, feedback may be provided to the user responsive to the user contact. Examples of such feedback include vibration or other tactile sensations, audio, visual (e.g., lights), and the like.

Next, block 320 provides for adjusting the displayed position of a selected clock hand responsive to relative locations on the display that the user contact occurs.

Optionally, the analog clock includes an hour hand and a minute hand, such that the selected clock hand is the minute hand. In this embodiment, the method may further include adjusting displayed position of the hour hand responsive to the adjusted displayed position of the minute hand (block 330).

If desired, such as that shown in block 340, digital time which corresponds the time represented by the analog clock may be displayed on the touchscreen display. Alternatively or additionally, time-related information (e.g., A.M., P.M.), which is associated with the time represented by the analog clock, may also be displayed.

At optional block 350, time identified by the analog clock is applied to an application operating on the electronic device. Types of applications to which the time may be applied include, for example, a user adjustable alarm clock, a user modifiable scheduler, a reservation application. A specific example is one in which the application is a user adjustable alarm clock, and the time identified by the analog clock represents a time at which an alarm is triggered.

If desired, the analog clock may be configured as an elapsed time clock, such that the method may further include causing an application operating on the electronic device to terminate according to the elapsed time identified by the analog clock.

Figure 4:
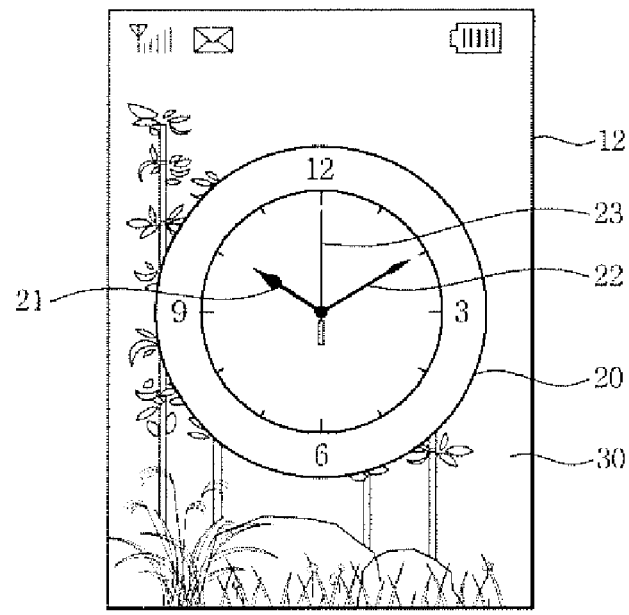
FIG. 4 depicts a touchscreen of a mobile terminal in accordance with an embodiment of the present invention.

FIG. 4 depicts a touchscreen of a mobile terminal in accordance with an embodiment of the present invention. Touchscreen 12 is shown displaying standby screen 30 and analog clock 20. The clock includes hour hand 21, minute hand 22, and second hand 23.

User contact may be accomplished via contact within a predetermined area of the touchscreen a number of times which correspond to selecting a specific clock hand. For example, hour hand 21 may be selected when a predetermined area (e.g., a background screen) of touchscreen 12 is touched once. Minute hand 22 may be selected when the predetermined area of the touchscreen is touched twice. Likewise, second hand 23 may be selected when the predetermined area of the touchscreen is touched three times. The predetermined area may include substantially the entire viewable portion of the touchscreen. If desired, a notification mark (e.g., a dotted line forming a closed-loop, an icon, and an image) may also be displayed to notify that a particular portion of the touchscreen permits selection of a specific clock hand.

Figure 5:
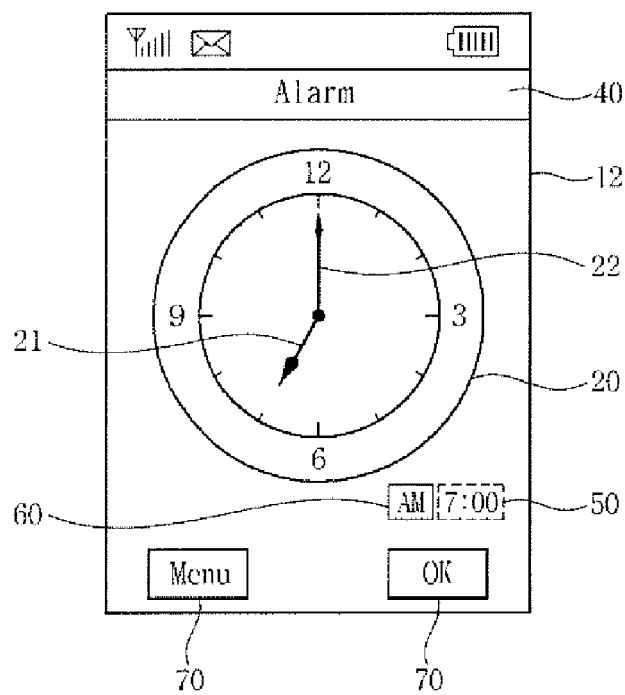
FIG. 5 depicts a touchscreen of a mobile terminal in accordance with another embodiment of the present invention.

FIG. 5 depicts a touchscreen of a mobile terminal in accordance with another embodiment of the present invention. In this example, analog clock 20 is configured in cooperation of a user adjustable alarm application 40. For instance, in an alarm-setting mode, the time represented by the clock may be adjusted to set an alarm time (i.e., a time at which an alarm to be activated). Note that in this example, the second hand is not required. The alarm-setting mode may be achieved using, for example, menu 70. Touchscreen 12 may also display digital time 50, which is time that is associated with the time represented by analog clock 20. The touchscreen also displays time-related information 60. If desired, the time identified by the analog clock may be applied to a snooze function associated with the alarm clock.

Figure 6:
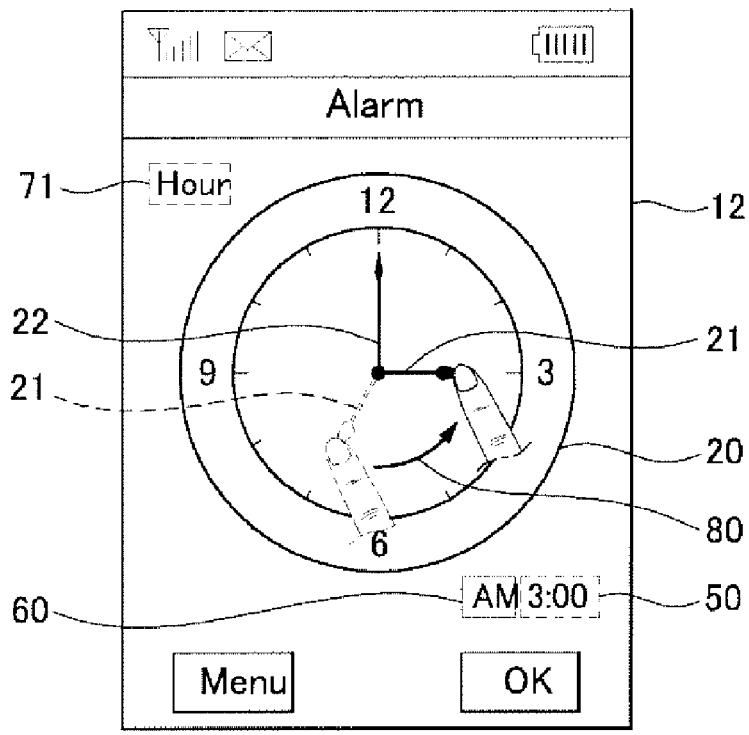
FIGS. 6 and 7 depict examples for adjusting displayed position of a selected clock hand relative to locations on the touchscreen display that user contact occurs.
Figure 7:
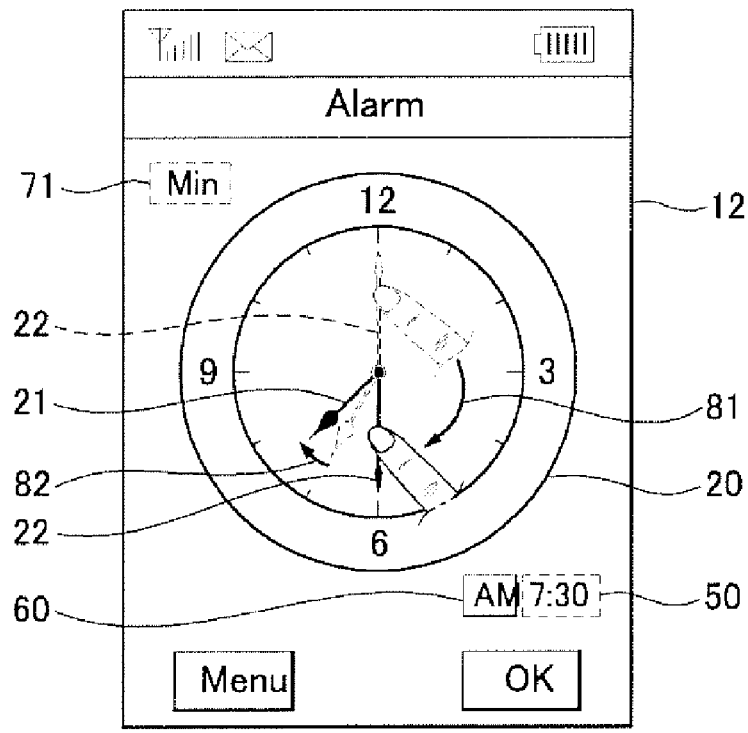

FIGS. 6 and 7 depict examples for adjusting displayed position of a selected clock hand relative to locations on the touchscreen display that user contact occurs. In FIG. 6, the user contacts the touchscreen relative to hour hand 21 (dashed lines) and then slides a finger or stylus, for example, in direction 80 until the hour hand is located at a desired location (i.e., a desired time setting). The example of FIG. 6 illustrates the adjusting of the hour hand 21 from the 7:00 position to the 3:00 position. Positioning of the hour hand can therefore be accomplished by a user sliding a finger from a first location to a second location. The first location being proximately located to the initial location of the hour hand, and the second location being proximately located to an identified dial location for which the selected clock hand is to be positioned. Typically, contact with the touchscreen relative to the hour hand is maintained during the adjusting period, but this is not a requirement. Note that indicator 71 illustrates that the hour hand is selected.

FIG. 7 depicts a similar procedure for which minute hand 22 is moved in direction 81 from a first location to a second location. In this example, movement of the minute hand causes hour hand 21 to correspondingly move in direction 82.

For example, when the user selects and drags the minute hand 22, the analog clock 20 indicates a value of "7:30." At this time, the user can set the alarm to "AM 7:30" by touching an optional "OK" touch button. In this example, indicator 71 depicts that the minute hand has been selected.

Figure 8:
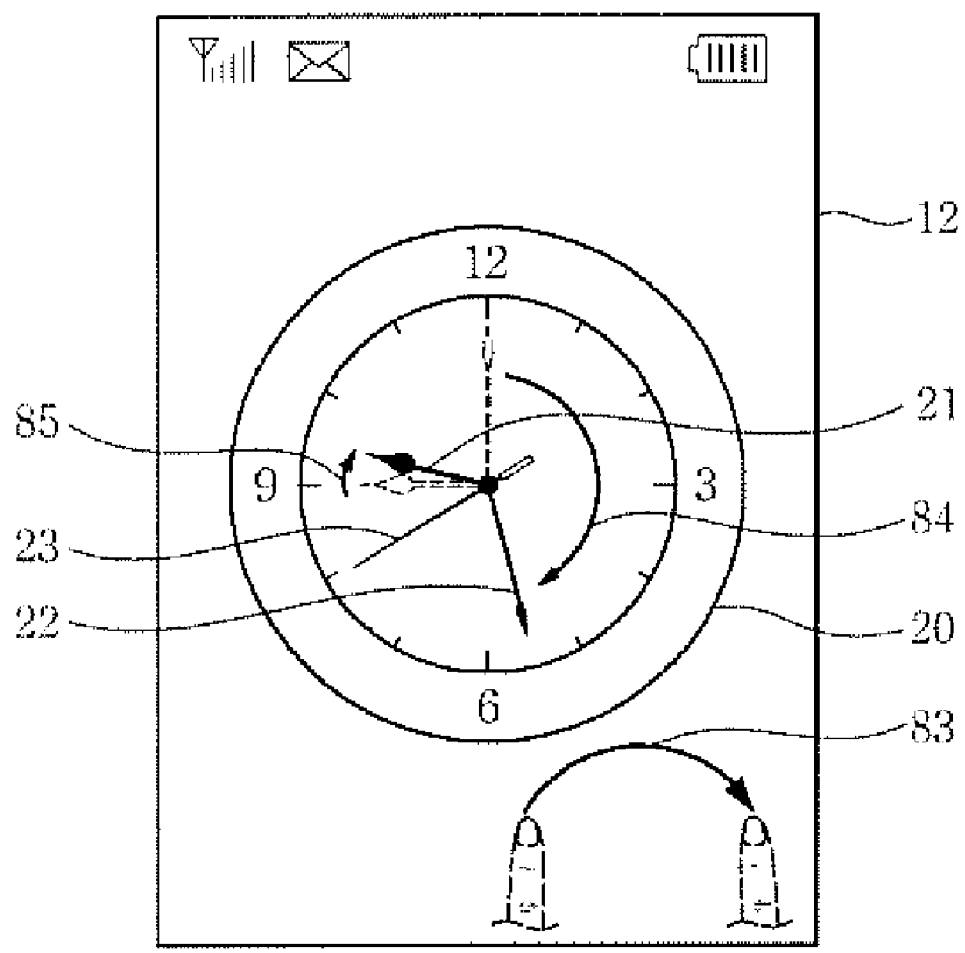
FIG. 8 depicts a touchscreen of a mobile terminal which permits clock adjustment using finger contact at various locations on the touchscreen

FIG. 8 depicts a touchscreen of a mobile terminal which permits clock adjustment using finger contact at various locations on the touchscreen. In this example, the user contacts touchscreen display 12 and slides a finger in direction 83 between first and second locations. This action causes the displayed position of a selected clock hand to be adjusted or otherwise moved (either direction 85 or direction 84) about the clock face a certain amount which corresponds to the distance between the first and second locations at which the finger contacts the touchscreen display. In addition, the direction at which the clock hand is adjusted (e.g., forward or rearward in time) may be determined based upon relative direction at which the finger contacts the touchscreen display. FIG. 6 further shows that hour hand 21 is adjusted responsive to the adjusting of minute hand 22.

In this embodiment, adjusting the clock hand does not require contact with the touchscreen at a location which is proximately located to the clock hand to be adjusted. In particular, the adjusting may be accomplished by contacting the touchscreen at locations other than on the clock face of analog clock. Furthermore, although FIG. 6 shows the adjusting with regard to minute hand 22, hour hand 21 may be adjusted in a similar manner.

Selecting of the clock hand which is to be adjusted may be determined using any of a variety of different techniques. For example, the selected clock hand may be determined responsive to a predetermined number of successive user contacts with the display. A specific and non-limiting example is one in which a single discrete user contact with the display indicates that either the hour or minute hand is to be adjusted, and two discrete user contacts with the display indicates that the other of the hour or minute hand is to be adjusted.

Figure 9A:
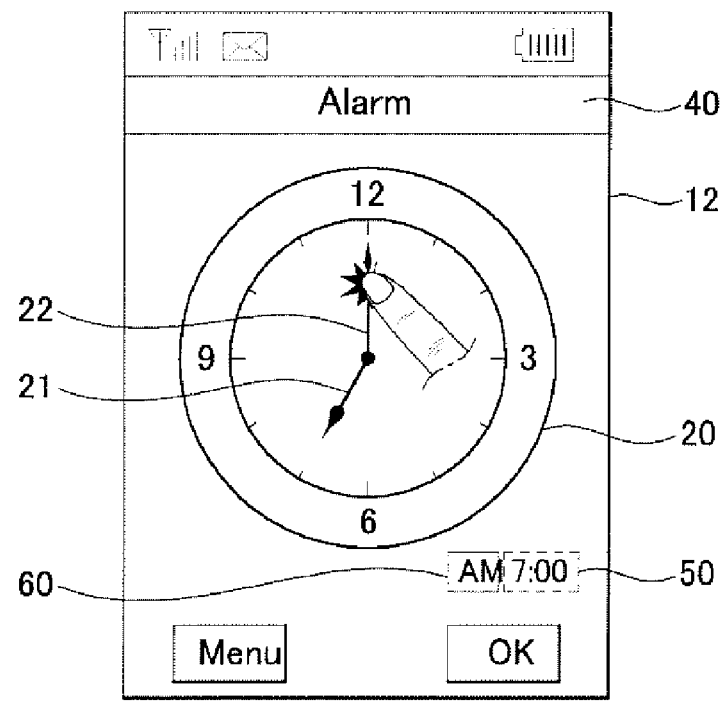
FIGS. 9A-9C depict a touchscreen of a mobile terminal which permits clock adjustment using finger contact at various locations on the touchscreen relative to a displayed clock face.
Figure 9B:
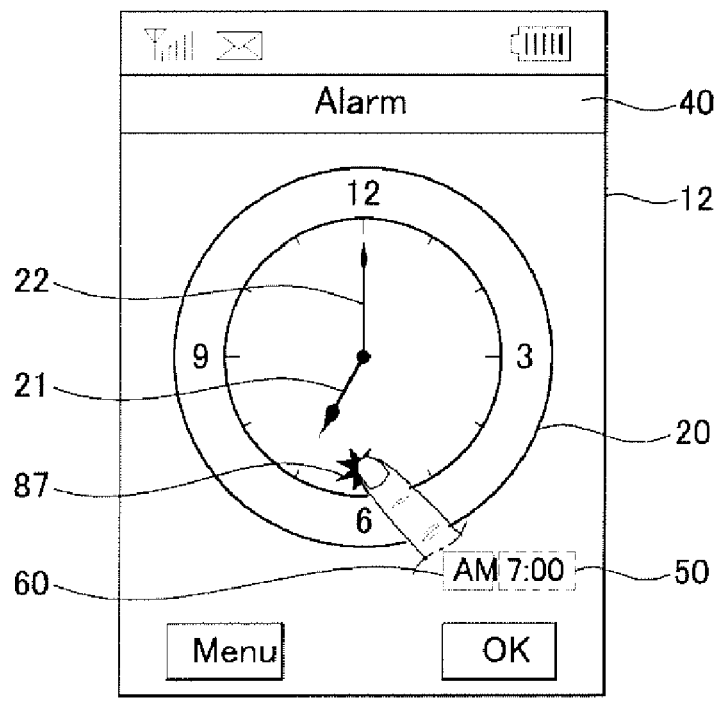
Figure 9C:
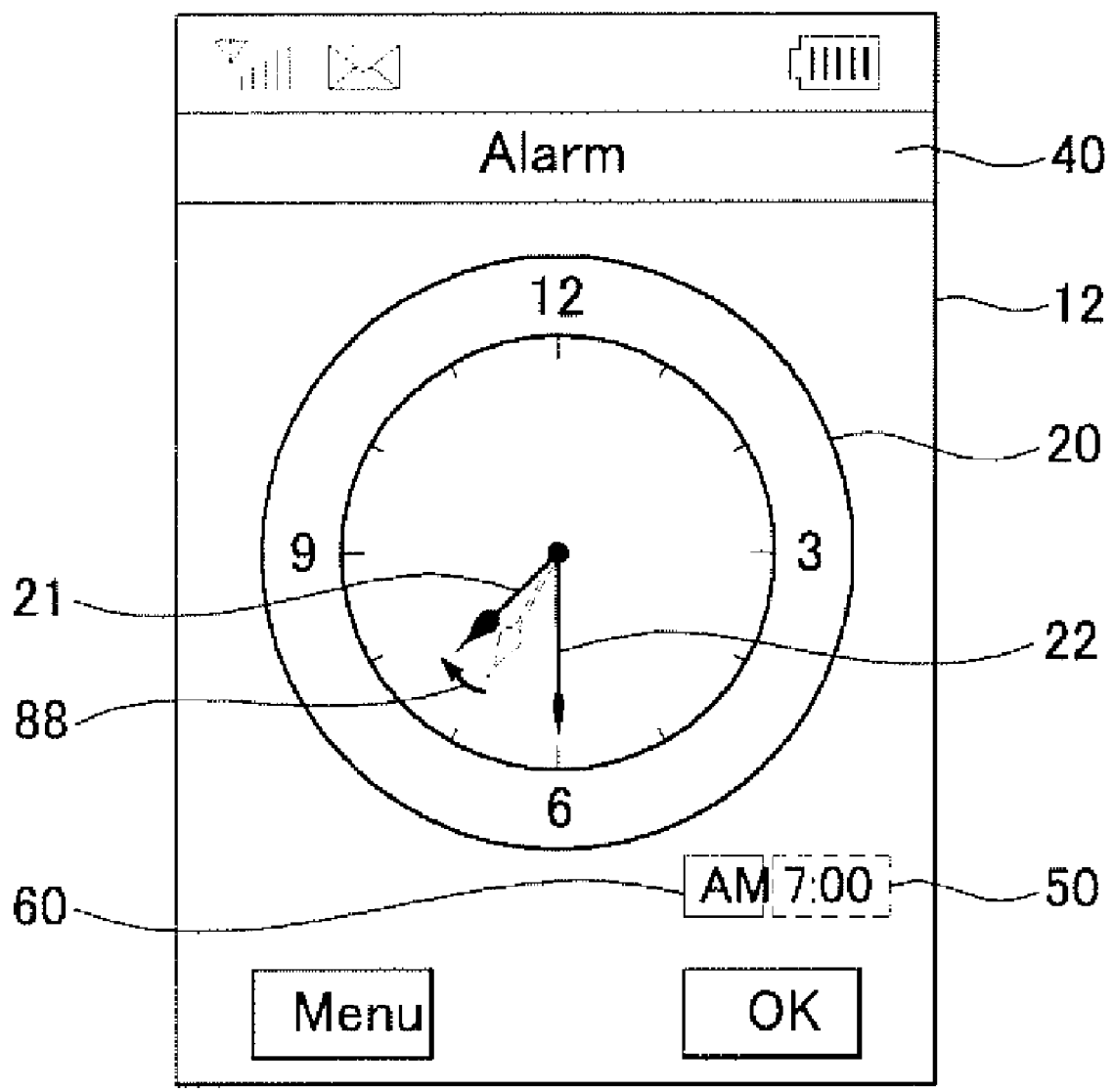

FIGS. 9A-9C depict a touchscreen of a mobile terminal which permits clock adjustment using finger contact at various locations on the touchscreen relative to a displayed clock face. By way of non-limiting example, the clock is adjusted from 7:00 to 7:30.

In FIG. 9A, a user contacts touchscreen 12 at a first location which is proximately located relative to a location at which the selected clock hand is displayed. In this particular example, minute hand 22 is the selected clock hand.

In FIG. 9B, a user contacts the touchscreen at second location 87 which is proximately located relative to an identified dial location (e.g., 7:30) for which the selected clock hand is to be positioned. The example of FIG. 9B shows the user contacting the clock dial near the number 6. Based upon, or responsive to, the contact at the second location, the clock is adjusted by moving the selected clock hand to a location which is adjacent to the identified dial location (FIG. 9C).

In addition, hour hand 21 is adjusted in direction 88 according to the amount of time that minute hand 22 is adjusted. Furthermore, digital time 50 and time-related information 60 may also be adjusted to reflect changes to analog clock 20.

Figure 10:
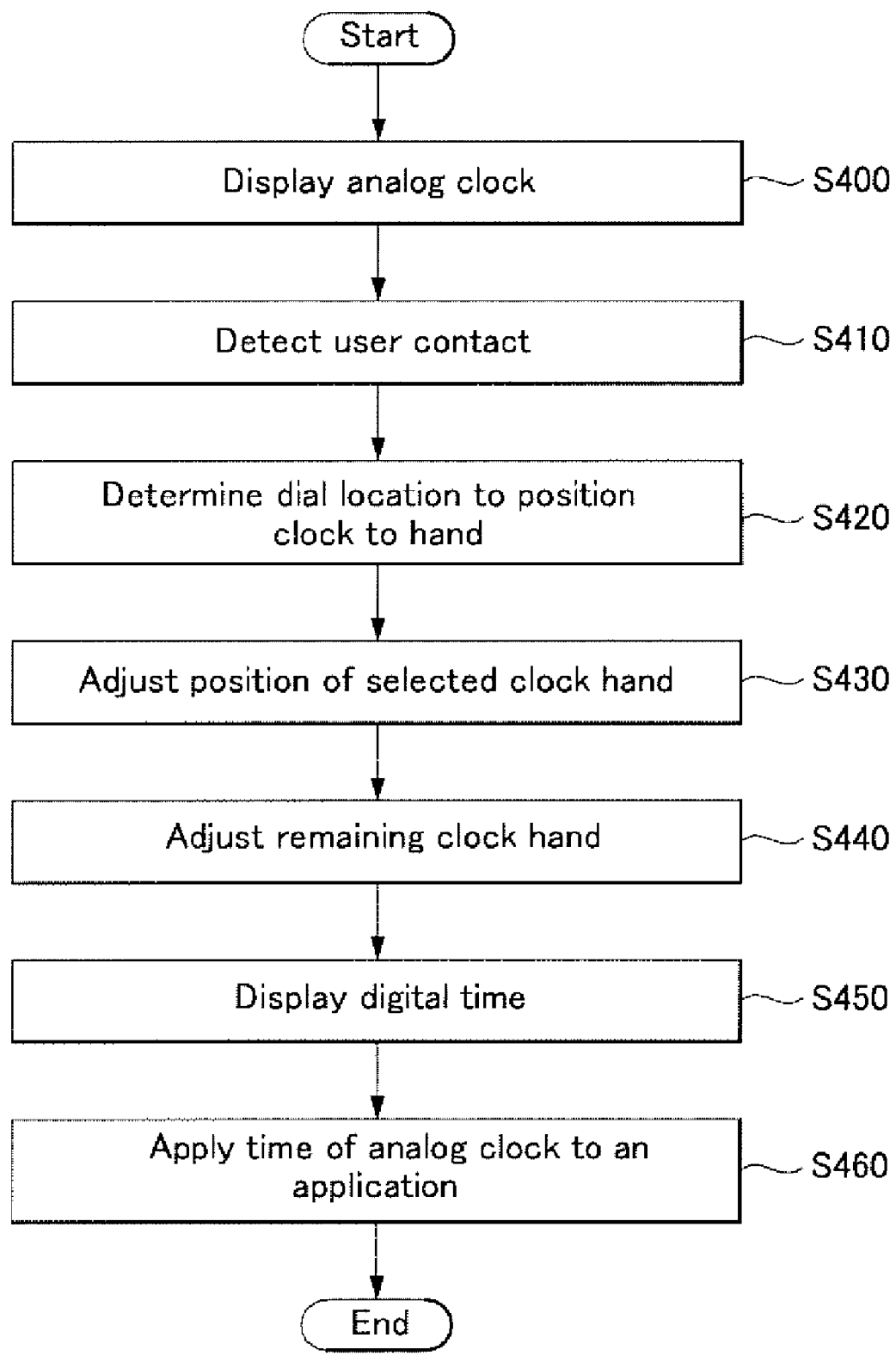
FIG. 10 is a flowchart depicting a method for adjusting an analog clock displayed on a touchscreen display of a mobile terminal using a gesture provided by a user.
Figure 11:
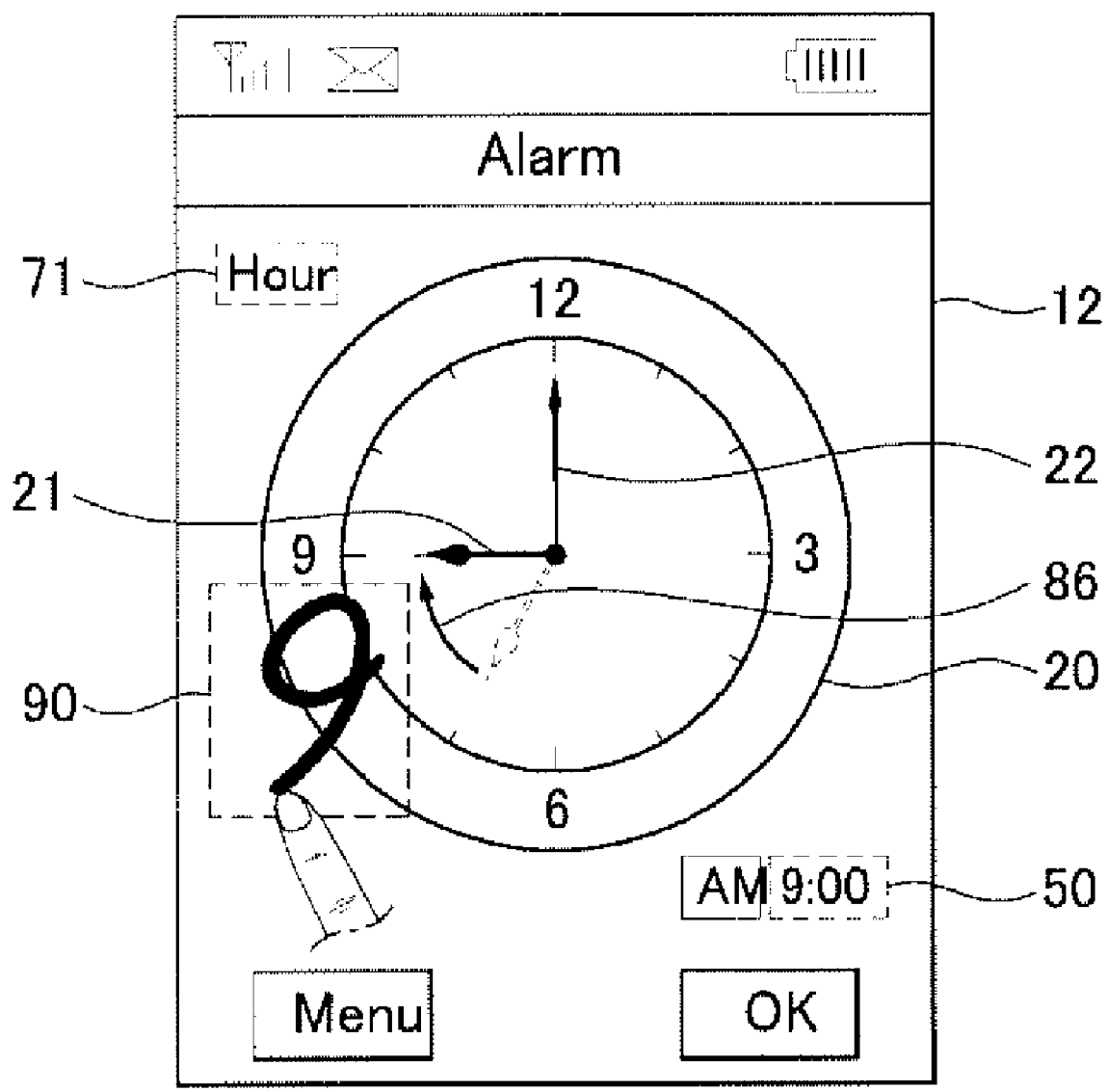
FIG. 11 depicts a touchscreen of a mobile terminal which permits clock adjustment via user input.

FIG. 10 is a flowchart depicting a method for adjusting an analog clock displayed on a touchscreen display of a mobile terminal using a gesture provided by a user. FIG. 11 depicts a touchscreen of a mobile terminal which permits clock adjustment via such user input. By way of example only, various operations of FIG. 10 will be described with regard to the touchscreen of FIG. 11. In this example, the clock is adjusted from 7:00 to 9:00.

Referring now to FIG. 10, operations associated with blocks S400 and S460 may be implemented using, for example, operations which are the same or similar to that which are described in FIG. 3, blocks S300 and S350, respectively.

At block S410, sliding user contact with the touchscreen display is detected. In an embodiment, the sliding user contact represents a gesture (e.g., number, letter, and the like). The example of FIG. 11 includes the user providing "9" as a gesture in portion 90 of touchscreen 12.

According to operation S420, a dial location for which a selected clock hand is to be positioned is determined based upon the gesture.

At block S430, the displayed position of the selected clock hand is adjusted based upon the determined dial location. Optionally, the analog clock includes an hour hand and a minute hand, such that the selected clock hand is the minute hand. In this embodiment, the method may further include adjusting displayed position of the hour hand responsive to the adjusted displayed position of the minute hand (block S440).

Several techniques may be used to implement the adjusting operation of block S440. One technique is to adjust or otherwise position the selected clock hand at a location on the dial which corresponds to a number which is represented by the detected gesture. For example, the user may input a gesture by "writing" the number 9 on the touchscreen. Based upon this input, the selected clock hand (e.g., the hour or minute hand) may be moved to the number 9 location on the dial.

Another technique is to adjust the clock hand (clockwise or counter clockwise) relative to the inputted number. For instance, consider that the clock hands of the analog clock represent 7:00 AM. If the detected gesture is the number "9," then the time represented by the clock is advanced nine hours resulting in the clock displaying 4:00 PM. In another example, the detected gesture is the number "9," the hour hand is moved clockwise such that the resulting time represented by the clock is 9:00 AM.

If desired, such as that shown in block S450, digital time which corresponds to time represented by the analog clock may be displayed on the touchscreen display. Alternatively or additionally, time-related information (e.g., A.M., P.M.), which is associated with time represented by the analog clock, may also be displayed.

Embodiments have been described in which clock hands of an analog clock are moved responsive to user input. Alternatives include moving the clock hands responsive to voice commands provided by a user. For instance, a user may speak the command "hour hand" to select an hour hand of the analog clock. The user then issues the voice command "9" which causes the commanded hour hand to move to the position of the clock associated with "9." Alternatively, the user may issue the command "half past nine" to cause the clock hands to indicated "9:30."

Although embodiments of the present invention may be implemented using the exemplary series of operations shown in various flowcharts presented herein, those of ordinary skill in the art will realize that additional or fewer operations may be performed. Moreover, it is to be understood that the order of the depicted operations is merely exemplary and that no single order of operation is required.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A method for adjusting an analog clock displayed on a touchscreen display of an electronic device, the method comprising:
    displaying the analog clock on the display, the analog clock comprising one or more clock hands, a clock face and a center about which the one or more clock hands effectively rotate;
    detecting user contact with the display, the user contact occurring at locations other than on the clock face of the analog clock on the display such that the detection of the user contact does not require contact with the display at a defined location which is proximately located to the clock face, the user contact comprising contact with the display at any location on the display except for the clock face; and
    adjusting a displayed position of a selected clock hand of the one or more clock hands responsive to relative locations on the display where the detected user contact occurs.

2. The method according to claim 1, the method further comprising:
    applying time identified by the analog clock to an application operating on the electronic device.

3. The method according to claim 2, wherein the application is a user adjustable alarm clock, and the time identified by the analog clock represents a time at which an alarm is triggered.

4. The method according to claim 2, wherein the application is a user modifiable scheduler.

5. The method according to claim 2, wherein the application is a device time application providing time to applications operating on the electronic device.

6. The method according to claim 1, the method further comprising:
    applying time identified by the analog clock to reserve an event in a reservation application operating on the electronic device.

7. The method according to claim 1, wherein the analog clock is an elapsed time clock, and wherein the method further comprises:
    causing an application operating on the electronic device to terminate according to the elapsed time identified by the analog clock.

8. The method according to claim 1, the method further comprising:
    causing an application operating on the electronic device to terminate at a time identified by the analog clock.

9. The method according to claim 1, the method further comprising:
    displaying digital time on the display which corresponds to time represented by the analog clock.

10. An electronic device, comprising:
    a touchscreen display; and
    a control unit for operating responsive to user contact with the display,
    wherein the control unit is configured to:
    display an analog clock on the display, the analog clock comprising one or more clock hands, a clock face and a center about which the one or more clock hands effectively rotate;
    detect user contact with the display, the user contact occurring at locations other than on the clock face of the analog clock on the display such that the detection of the user contact does not require contact with the display at a defined location which is proximately located to the clock face, the user contact comprising contact with the display at any location on the display except for the clock face; and
    adjust a displayed position of a selected clock hand of the one or more clock hands responsive to relative locations on the display where the detected user contact occurs.

11. The electronic device according to claim 10, wherein the control unit is further configured to:
    apply time identified by the analog clock to an application operating on the electronic device.

12. The electronic device according to claim 11, wherein the application is a user adjustable alarm clock, and the time identified by the analog clock represents a time at which an alarm is triggered.

13. The electronic device according to claim 11, wherein the application is a user modifiable scheduler.

14. The electronic device according to claim 11, wherein the application is a device time application providing time to applications operating on the electronic device.

15. The electronic device according to claim 10, wherein the control unit is further configured to:
    apply time identified by the analog clock to reserve an event in a reservation application operating on the electronic device.

16. The electronic device according to claim 10, wherein the analog clock is an elapsed time clock, and wherein the control unit is further configured to:
    cause an application operating on the electronic device to terminate according to the elapsed time identified by the analog clock.

17. The electronic device according to claim 10, wherein the control unit is further configured to:
    cause an application operating on the electronic device to terminate at a time identified by the analog clock.

18. The electronic device according to claim 10, wherein the control unit is further configured to:
  display digital time on the display which corresponds to time represented by the analog clock.

19. An electronic device, comprising:
  a touchscreen display; and
  a control unit for operating responsive to user contact with the display,
  wherein the control unit is configured to:
  display an analog clock on the display, the analog clock comprising one or more clock hands;
  detect user contact with the display; and
  adjust a displayed position of a selected clock hand of the one or more clock hands responsive to relative locations on the display where the detected user contact occurs,
  wherein the detected user contact comprises a gesture of writing at least a number or letter.

20. A method for adjusting an analog clock displayed on a touchscreen display of a mobile terminal, the method comprising:
  displaying the analog clock on a standby screen in an idle mode of the mobile terminal, the analog clock comprising one or more clock hands, a clock face and a center about which the one or more clock hands effectively rotate;
  detecting user contact with the display, the user contact occurring at locations other than on the clock face of the analog clock on the display such that the detection of the user contact does not require contact with the display at a defined location which is proximately located to the clock face, the user contact comprising contact with the display at any location on the display except for the clock face; and
  adjusting a displayed position of a selected clock hand of the one or more clock hands responsive to relative locations on the display where the detected user contact occurs.

21. A mobile terminal, comprising:
  a touchscreen display; and
  a control unit for operating responsive to user contact with the display, wherein the control unit is configured to:
  display an analog clock on a standby screen in an idle mode of the mobile terminal, the analog clock comprising one or more clock hands, a clock face, and a center about which the one or more clock hands effectively rotate;
  detect user contact with the display, the user contact occurring at locations other than on the clock face of the analog clock on the display such that the detection of the user contact does not require contact with the display at a defined location which is proximately located to the clock face, the user contact comprising contact with the display at any location on the display except for the clock face; and
  adjust a displayed position of a selected clock hand of the one or more clock hands responsive to relative locations on the display where the detected user contact occurs.

* * * * *